United States Patent
Liu (10) Patent No.: US 9,495,054 B2
(45) Date of Patent: Nov. 15, 2016

(54) TOUCH CONTROL SYSTEM AND COORDINATE CORRECTION METHOD THEREOF

(71) Applicant: MStar Semiconductor, Inc., Hsinchu Hsien (TW)

(72) Inventor: Tzu-Wei Liu, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 73 days.

(21) Appl. No.: 14/656,822

(22) Filed: Mar. 13, 2015

(65) Prior Publication Data

US 2015/0261357 A1 Sep. 17, 2015

(30) Foreign Application Priority Data

Mar. 14, 2014 (TW) .................................. 103109344

(51) Int. Cl.
*G06F 3/044* (2006.01)
*G06F 3/041* (2006.01)

(52) U.S. Cl.
CPC ............. *G06F 3/044* (2013.01); *G06F 3/0418* (2013.01)

(58) Field of Classification Search
CPC ............................... G06F 3/044; G06F 3/0418
USPC ........................................................ 345/173
See application file for complete search history.

(56) References Cited

U.S. PATENT DOCUMENTS

| 6,366,866 | B1 * | 4/2002 | Kanagawa | G06F 3/045 178/18.02 |
|---|---|---|---|---|
| 2010/0321328 | A1 * | 12/2010 | Chang | G06F 3/0416 345/174 |
| 2011/0057905 | A1 * | 3/2011 | Yu | G06F 3/0418 345/174 |
| 2013/0135216 | A1 * | 5/2013 | Chiang | G06F 3/044 345/173 |
| 2014/0340355 | A1 * | 11/2014 | Cheng | G06F 3/0418 345/174 |
| 2014/0354563 | A1 * | 12/2014 | Zhang | G06F 3/0421 345/173 |

* cited by examiner

*Primary Examiner* — Ariel Balaoing
(74) *Attorney, Agent, or Firm* — Edell, Shapiro & Finnan, LLC (57) ABSTRACT

A touch control system includes first and second sensing regions. At least one sensor monitors the first sensing region to generate a first sensing amount. At least one second sensor monitors the second sensing region to generate a second sensing amount. An initial coordinate generating module generates an initial coordinate according to the first and second sensing amounts, and determines whether a touch point is in an intersection region. When the determination result of the initial coordinate generating module is affirmative, a correction value generating module generates a correction value according to the first and second sensing amounts. A corrected coordinate generating module multiplies the initial coordinate by a first weight to generate a first weighted result, multiplies the correction value by a second weight to generate a second weighted result, and adds the first and the second weighted results to generate a corrected coordinate.

14 Claims, 6 Drawing Sheets

TOUCH CONTROL SYSTEM AND COORDINATE CORRECTION METHOD THEREOF

This application claims the benefit of Taiwan application Serial No. 103109344, filed Mar. 14, 2014, the subject matter of which is incorporated herein by reference.

BACKGROUND OF THE INVENTION

1. Field of the Invention

The invention relates in general to a touch control system, and more particularly, to a correction technology of a touch control system including multiple sensing regions.

2. Description of the Related Art

Operating interfaces of recent electronic products have become increasingly user-friendly and intuitive with the progressing technology. For example, through a touch screen, a user can directly interact with applications and input messages/texts/patterns with fingers or a stylus, thus eliminating complexities associated with other input devices such as a keyboard or buttons. In practice, a touch screen usually comprises a touch panel and a display disposed at the back of the touch panel. According to a touch position on the touch panel and a currently displayed image on the display, an electronic device determines an intention of the touch to execute corresponding operations.

Figure 1:
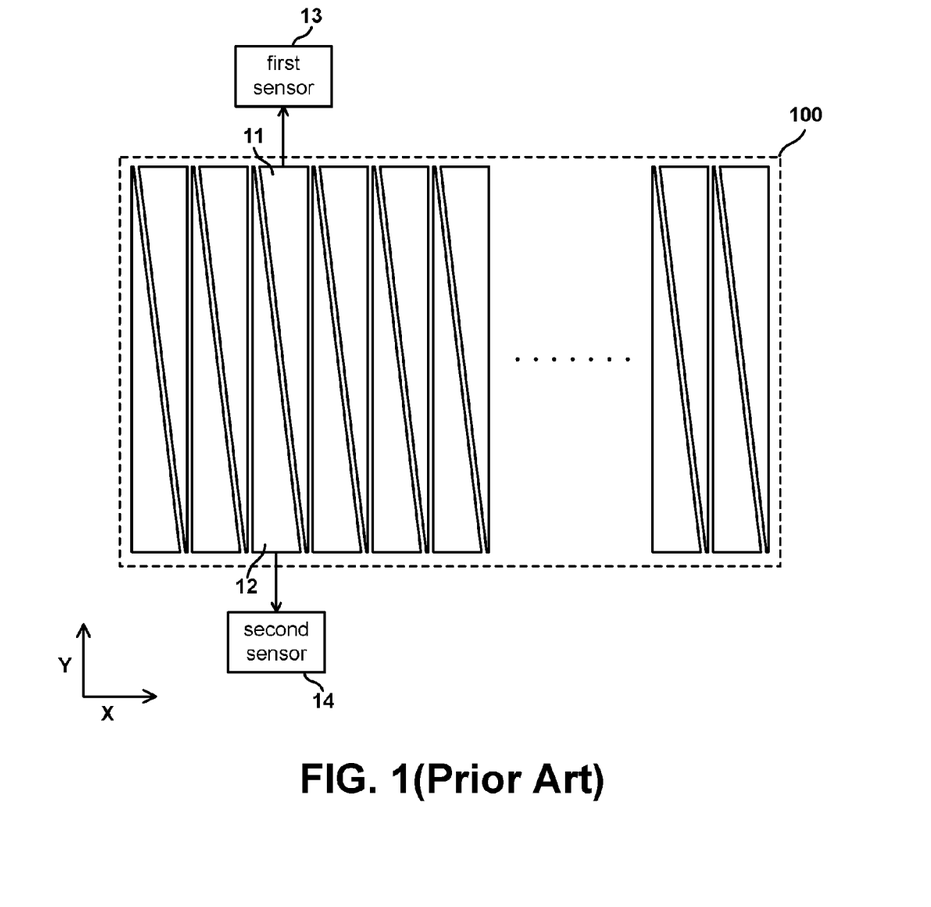
FIG. 1 and FIG. 2 are exemplary electrode configurations of a conventional self-capacitive touch panel.

Existing capacitive touch sensing techniques can be roughly categorized into self-capacitive and mutual-capacitive types. Compared to mutual-capacitive touch panels, self-capacitive touch panels can be implemented through a single-layer electrode with a simpler manufacturing process and lower costs, and thus prevail in many entry-level electronic products. FIG. 1 is an exemplary electrode configuration of a self-capacitive touch panel. A sensing region 100 represented by a dotted frame includes a plurality of triangular electrodes in a staggered arrangement along the X direction. The electrodes are connected to one or multiple sensors (only a first sensor 13 connected to an electrode 11 and a first sensor 14 connected to an electrode 12 are depicted as an example), which then detect capacitance changes of the electrodes. The detection results are provided to a controller (not shown) for the controller to determine a position of the user touch.

Figure 2:
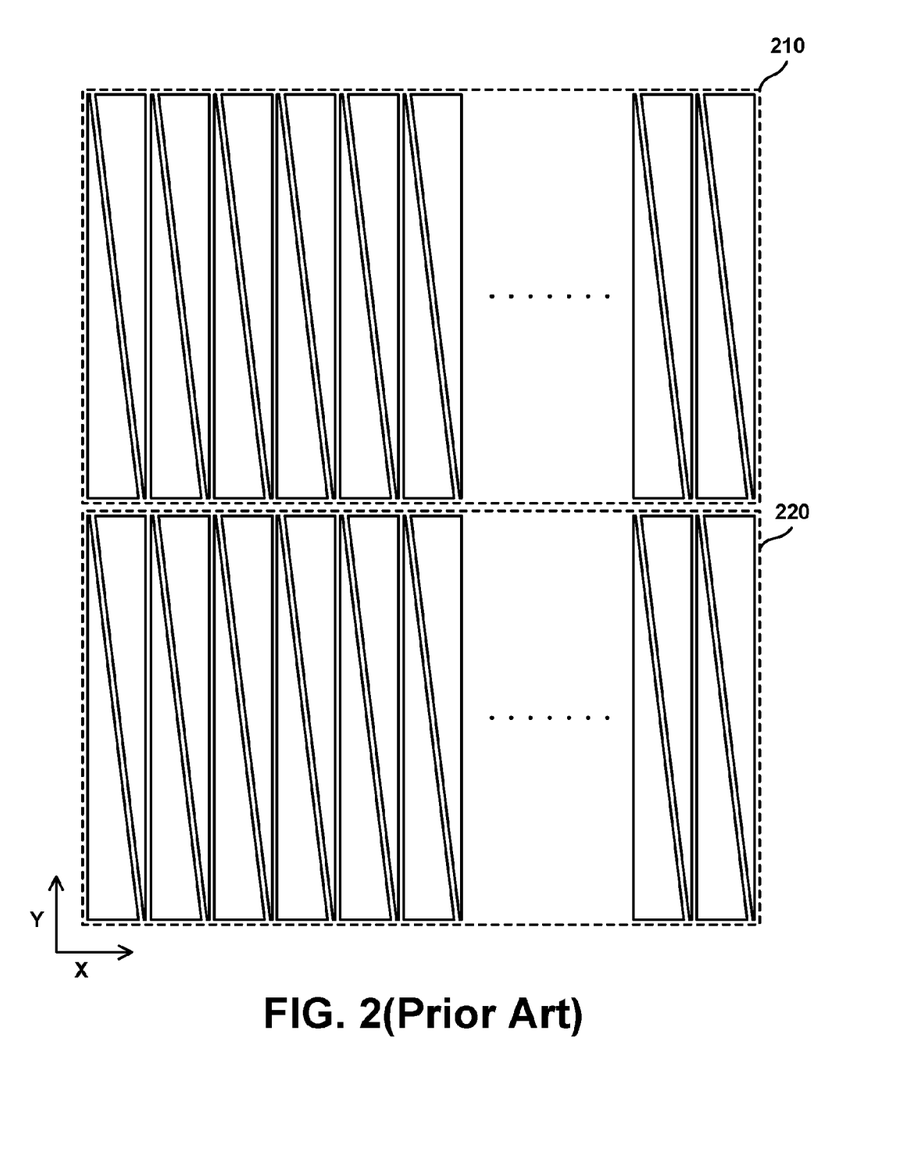

To increase a touch control area, an electrode configuration that forms multiple sensing regions is developed in the recent years. In the example in FIG. 2, electrodes are divided into an upper group and a lower group to respectively form two different sensing regions 210 and 220. In current technologies, a controller determines a Y coordinate $Y_0$ of the touch point according to an equation below:

$$Y_0 = \frac{Ucd}{(Ucd + Dcd)} \times y_1 + \frac{Dcd}{(Ucd + Dcd)} \times y_2 \quad \text{equation (1)}$$

In equation (1), Ucd represents a total capacitance change of all the electrodes in the sensing region 210, Dcd represents a total capacitance change of all the electrodes in the sensing region 220, $y_i$ represents a Y coordinate according to only the capacitance changes in the sensing region 210 (i.e., the capacitance changes in the sensing region 220 are not considered), and $y_2$ represents a Y coordinate calculated according to the capacitance changes in the sensing region 220 (i.e., the capacitance changes in the sensing region 210 are not considered).

Figure 3:
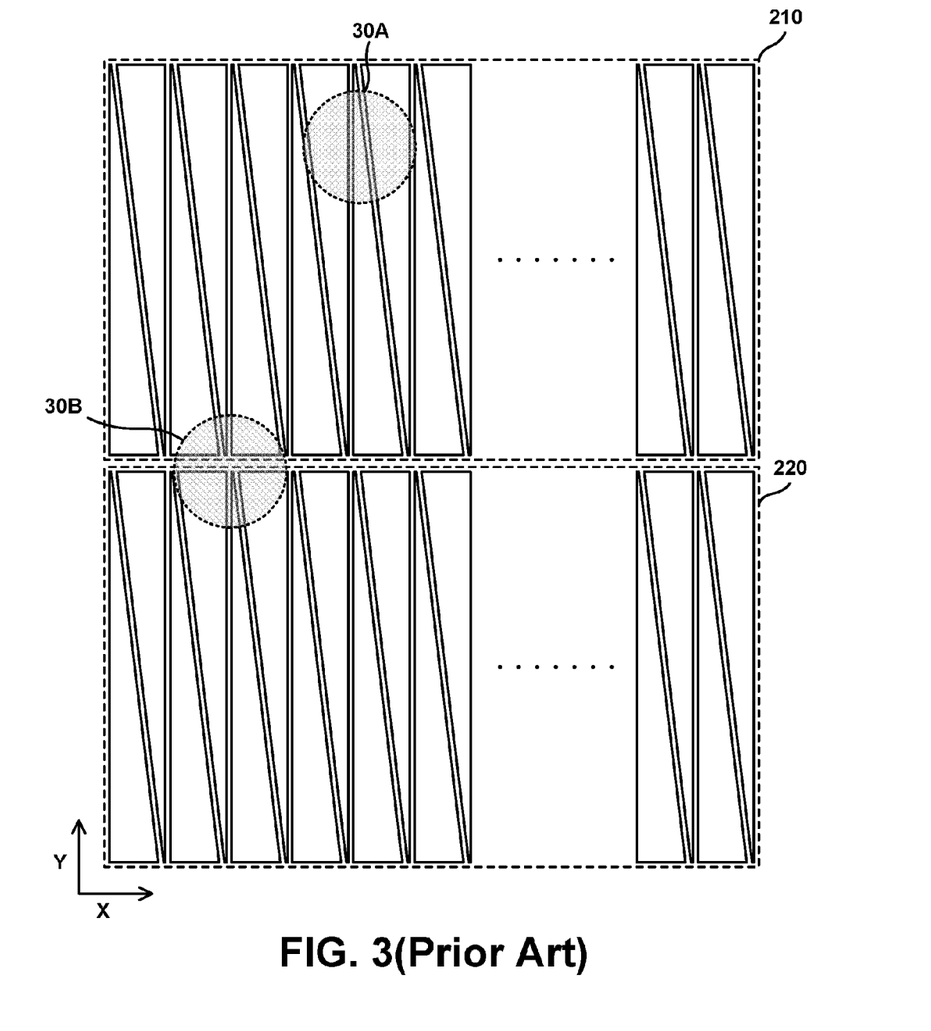
FIG. 3 shows an example of a position of a user touch.

Referring to FIG. 3, when a touch position occurs at a position 30A, it mainly affects the sensing region 210, and so a noticeable total capacitance change $Ucd_A$ occurs. At this point, a total capacitance change $Dcd_A$ is almost zero. When the value of the total capacitance change $Dcd_A$ is lower than a threshold, the total capacitance change $Dcd_A$ may be omitted when the coordinate $Y_0$ is calculated. In this situation, the coordinate $Y_0$ is equal to the coordinate $y_1$. In contrast, when the position of the user touch occurs at a position 30B, the influence of the touch event is quite evenly distributed to the two total capacitance changes $Ucd_B$ and $Dcd_B$. It is apparent that values of both the total capacitance changes $Ucd_B$ and $Dcd_B$ are lower than the total capacitance change $Ucd_A$. For example, the value of the total capacitance change $Ucd_A$ may be around 500 microfarad (μF), and the values of the total capacitance changes $Ucd_B$ and $Dcd_B$ may be around 200 Known to one person skilled in the art, compared to the total capacitance change $Ucd_A$, signal-to-noise (SNR) ratios of the total capacitance changes $Ucd_B$ and $Dcd_B$ are lower. As seen from equation (1), when the total capacitance changes $Ucd_B$ and $Dcd_B$ are considered (i.e., when the user touch occurs at an intersection region of the sensing regions 210 and 220), the noises in the total capacitance changes $Ucd_B$ and $Dcd_B$ impose considerable effects on the calculation result. More specifically, as a drawback of a conventional solution, when the user touch occurs at an intersection region of the sensing regions 210 and 220, the coordinate $Y_0$ calculated according to equation (1) usually contains a large error. Such situation of an error occurring at a boundary region of the sensing regions may lead the controller to misjudge a user intention to further cause an erroneous operation result.

SUMMARY OF THE INVENTION

The invention is directed to a touch control system and a coordinate correction method. The concept of the present invention is applicable to not only self-capacitive touch panels but also other touch control apparatuses including multiple sensing regions.

A touch control system is provided according to an embodiment of the present invention. The touch control system includes a first sensing region, a second sensing region, at least one first sensor, at least one second sensor, an initial coordinate generating module, a correction value generating module and a corrected coordinate generating module. A part of the first sensing region and a part of the second sensing region are defined as an intersection region. The at least one sensor monitors the first sensing region to generate at least one sensing amount. The at least one second sensor monitors the second sensing region to generate at least one second sensing amount. The initial coordinate generating module generates an initial coordinate according to the at least one first sensing amount and the at least one second sensing amount, and determines whether a touch point corresponding to the initial coordinate is in the intersection region. When the determination result of the initial coordinate generating module is affirmative, the correction value generating module generates a corrected value according to the at least one sensing amount and the at least one second sensing amount. The corrected coordinate generating module multiplies the initial coordinate by a first weight to generate a first weighted result, multiplies the correction value by a second weight to generate a second weighted result, and adds the first weighted result and the second weighted result to generate a corrected coordinate of the touch point.

A coordinate correction method for a touch panel is provided according to another embodiment of the present invention. The touch panel includes a first sensing region and a second region. The first sensing region is monitored by at least one first sensor to generate at least one sensing amount. The second sensing region is monitored by at least one second sensor to generate at least one second sensing result. A pre-defined intersection region includes a part of the first sensing region and a part of the second sensing region. The method includes: generating an initial coordinate according to the at least one first sensing amount and the at least one second sensing amount; determining whether a touch point corresponding to the initial coordinate is in the intersection region; when the determination result is affirmative, generating a correction value according to the at least one first sensing amount and the at least one second sensing amount; multiplying the initial coordinate by a first weight to generate a first weighted result, and multiplying the correction value by a second weight to generate a second weighted result; and adding the first weighted result and the second weighted result to generate a corrected coordinate of the touch point.

The above and other aspects of the invention will become better understood with regard to the following detailed description of the preferred but non-limiting embodiments. The following description is made with reference to the accompanying drawings.

It should be noted that, the drawings of the present invention include functional block diagrams of functional modules that are related to one another. These drawings are not detailed circuit diagrams, and connecting lines therein are for indicating signal flows. Direct electrical connections are not essential to achieve interactions between the functional elements and/or processes. Further, functions of individual elements need not be assigned as shown in the drawings, and discrete blocks may not be physically separate electronic elements.

DETAILED DESCRIPTION OF THE INVENTION

Figure 4:
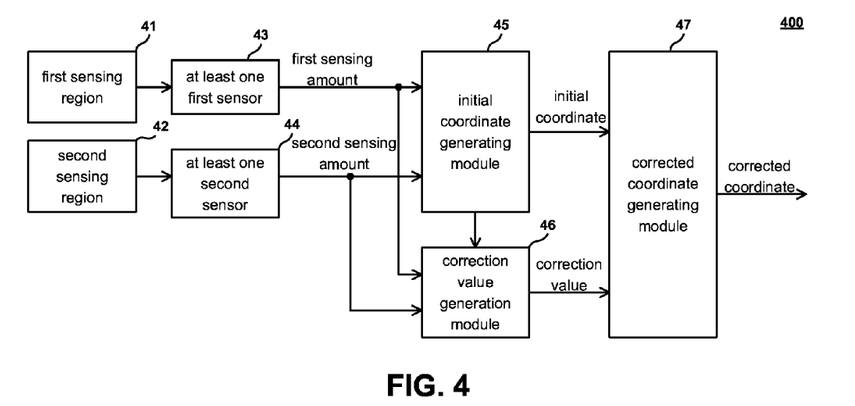
FIG. 4 is a functional block diagram of a self-capacitive touch control system according to an embodiment of the present invention.

FIG. 4 shows a functional block diagram of a touch control system 400 according to an embodiment of the present invention. The touch control system 400 includes a first sensing region 41, a second sensing region 42, at least one first sensor 43, at least one second sensor 44, an initial coordinate generating module 45, a correction value generating module 46, and corrected coordinate generating module 47. For example, the first sensing region 41 and the second sensing region 42 may respectively be the sensing regions 210 and 220 respectively including multiple self-capacitive electrodes in FIG. 3. For illustration purposes, in embodiments below, it is assumed that the first sensing region 41 and the second sensing region 42 are separated from each other in the Y direction as the sensing regions 210 and 220, and have adjacent borders substantially parallel to the X coordinate axis. Under the premise, the main function of the corrected coordinate generating module 47 is correcting an error in the Y coordinate. Calculation and correction details of the X coordinate are not a focus of the present invention, and are generally known to one person skilled in the art and shall be omitted herein.

In practice, the number of the first sensor 43 and the number of the second sensor 44 may be determined by a circuit designer according to hardware costs as well as the numbers the electrodes in the first sensing region 41 and the second sensing region 42. The at least one first sensor 43 monitors the first sensing region 41 to generate at least one first sensing amount (e.g., a capacitance change). The at least one second sensor 44 monitors the second sensing region 42 to generate at least one second sensing amount. For example, if the first sensing region 41 includes a total of an N number of electrodes and each of the electrodes is monitored by one first sensor, the at least one first sensor 43 generates a total of an N number of first sensing amounts.

When the touch system 400 determines that a user touch occurs in the first sensing region 41 and/or the second sensing region 42, the initial coordinate generating module 34 generates an initial coordinate $Y_0$, i.e., the non-corrected Y coordinate of the touch point, according to the at least one first sensing amount and the at least one second sensing amount. For example, the initial coordinate generating module 45 generates the initial coordinate $Y_0$ according to an equation below:

$$Y_0 = \frac{Ucd}{(Ucd + Dcd)} \times y_1 + \frac{Dcd}{(Ucd + Dcd)} \times y_2 \qquad \text{equation (2)}$$

In equation (2), Ucd represents a total of the at least one first sensing amount, Dcd represents a total of the at least one second sensing amount, $y_1$ represents a first coordinate generated according to only the at least one first sensing amount (without considering the at least one second sensing amount), and $y_2$ represents a second coordinate generated according to only the at least one second sensing amount (without considering the at least one first sensing amount). In other words, the initial coordinate $Y_0$ may be a weighted result of the first coordinate $y_1$ and the second coordinate $y_2$, with respective weighted coefficients being determined by the total Ucd of the first sensing amount and the total Dcd of the second sensing amount. It should be noted that, methods for generating the first coordinate $y_1$ and the second coordinate $y_2$ are not limited by the present invention, and are generally known to one person skilled in the art and shall be omitted herein.

Figure 5:
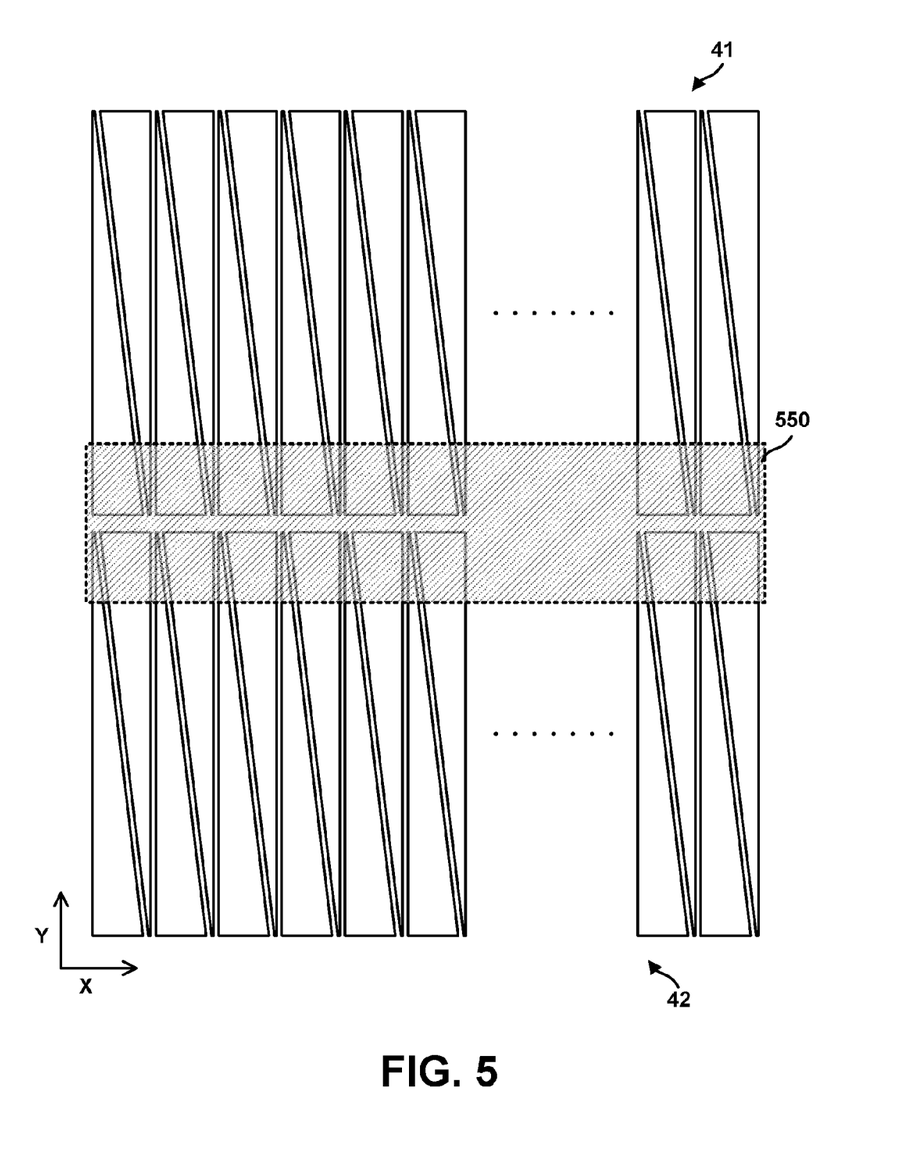
FIG. 5 is an example of a range of an intersection region.

According to an embodiment of the present invention, a pre-defined intersection region includes a part of the first sensing region 41 and a part of the second sensing region 42. In FIG. 5, taking the electrode configuration in FIG. 3 as an example, an intersection region 550 is included. After generating the initial coordinate $Y_0$, the initial coordinate generating module 45 determines whether a touch point corresponding to the initial coordinate $Y_0$ is in the intersection region 440. When the determination result of the initial coordinate generating module 45 is affirmative, the correction value generating module 46 and the corrected coordinate generating module 47 are driven to generate a corrected coordinate Y" to replace the initial coordinate $Y_0$. Conversely, when the determination result of the initial coordinate generating module 45 is negative, the touch control system 400 directly determines the initial coordinate $Y_0$ as the touch point and does not correct the initial coordinate $Y_0$.

As shown in FIG. 4, when the determination result of the initial coordinate generating module 45 is affirmative, the correction value generating module 46 generates a correction value $Y_C$ according to the first sensing amount provided by the at least one first sensor 43 and the second sensing amount provided by the at least one second sensor 44. The corrected coordinate generating module 47 then multiplies the initial coordinate $Y_0$ by a first weight $w_1$ to generate a first weighted result, multiplies the correction value $Y_C$ by a second weight $w_2$ to generate a second weighted result, and adds the first weighted result and the second weighted result to generate a corrected coordinate Y":

$$Y''=Y_0 \times w_1 + Y_C \times w_2 \quad \text{equation (3)}$$

In practice, a circuit designer may determine the range of the intersection region 440 through simulations or experiments. For example, a circuit designer may first identify a range in which the initial coordinate $Y_0$ is caused to have an error that is higher than a predetermined threshold under the influence of noises, and define that range as the intersection region 550. The circuit designer may than determine a difference between an ideal value of the Y coordinate in the intersection region 550 and the initial coordinate $Y_0$ through simulations or experiments. Accordingly, the method for generating the corrected value $Y_C$ and the values of the first weight $w_1$ and the second weight $w_2$ may be determined to aim at minimizing a difference between the ideal value of the Y coordinate and the corrected coordinate Y". In one embodiment, the correction value generating module 46 generates the corrected value $Y_C$ according to an equation:

$$Y_C = \frac{(Ucd - Dcd)}{(Ucd + Dcd)} \times \text{y\_scale} + \text{y\_shift} \quad \text{equation (4)}$$

In equation (4), Ucd represents the total of the at least one first sensing amount, Dcd represents the total of the at least one second sensing amount, y_shift represents a reference coordinate in a first reference direction (Y), and y_scale represents a predetermined width in the reference direction. For example, when the lowermost Y coordinate in the second sensing region 42 is 0 and the uppermost Y coordinate in the first sensing region 41 is 2048, the value of y_shift may be set to an intermediate value 1024 (when the intersection region 440 occupies substantially equal areas in the first sensing region 41 and the second sensing region 42, the value of y_shift corresponds to the Y coordinate at the center of the intersection region 550). In practice, the value of y_scale may be determined through the foregoing simulations or experiments. Considering additional errors, e.g., measurement errors caused by panel deformation, in one preferred embodiment, the width of the intersection region 550 in the Y direction is designed to substantially equal to three times of the predetermined width y_scale.

According to the present invention, the first weight $w_1$ and the second weight $w_2$ in equation (3) may be constant values, and may be designed to be associated with the initial coordinate $Y_0$. In one embodiment, as the initial coordinate $Y_0$ gets closer to the center of the intersection region 550 in the Y direction, the first weight $w_1$ gets smaller and the second weight $w_2$ gets larger. For example, the first weight $w_1$ may be set to 1 and the second weight $w_0$ may be set to 0 for positions at upper and lower borders of the intersection region 550, and the first weight $w_1$ may be set to 0 and the second weight $w_0$ may be set to 1 for positions at the center of the intersection region 550.

Figure 6:
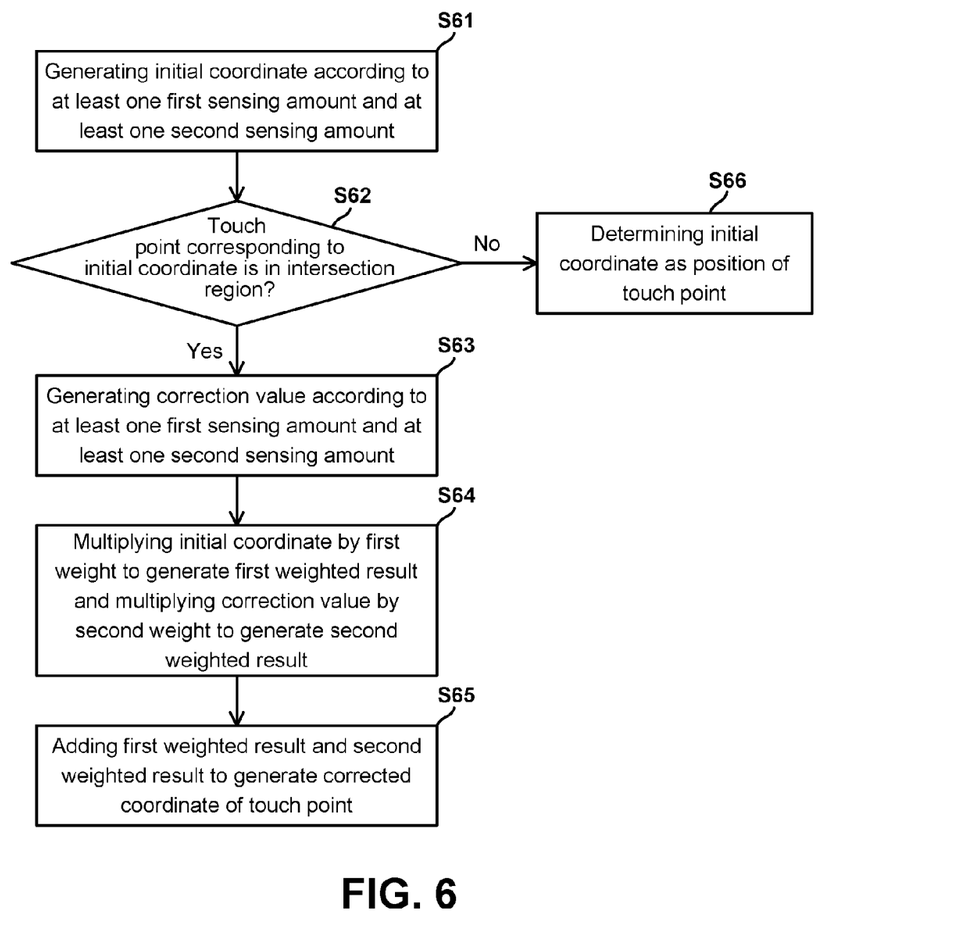
FIG. 6 is a process of a coordinate correction method according to an embodiment of the present invention.

FIG. 6 shows a process of a coordinate correction method for a touch panel according to another embodiment of the present invention. The touch panel includes a first sensing region and a second sensing region. The first sensing region is monitored by at least one first sensor to generate at least one first sensing amount. The second sensing region is monitored by at least one second sensor to generate at least one second sensing amount. An intersection region that at the same time covers both the first sensing region and the second sensing region is pre-defined. The method includes following steps. In step S61, an initial coordinate is generated according to the at least one first sensing amount and the at least one second sensing amount. In step S62, it is determined whether a touch point corresponding to the initial coordinate is in the intersection region. Step S63 is performed when a determination result of step S62 is affirmative to generate a correction value according to the at least one first sensing amount and the at least one second sensing amount. In step S64, the initial coordinate is multiplied by a first weight to generate a first weighted result, and the correction value is multiplied by a second weight to generate a second weighted result. In step S65, the first weighted result and the second weighted result are added to generate a corrected coordinate of the touch point. As shown in FIG. 6, when the determination result of step S62 is negative, the initial coordinate is determined as a position of the touch point in step S66.

One person skilled in the art can understand that, operation details and variations in the description associated with the touch control system 400 are applicable to the coordinate correction method in FIG. 6, and shall be omitted herein.

It should be noted that, the mathematical expressions are for illustrating principles and logics associated with the embodiments of the present invention. Unless otherwise specified, these mathematical expressions are not to be construed as limitations to the present invention. One person skilled in the art can understand that various technologies can realize the physical forms corresponding to these mathematical expressions.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A touch control system, comprising:
   a first sensing region;
   a second sensing region, wherein a part of the first sensing region and a part of the second sensing region are defined as an intersection region;
   at least one first sensor, configured to monitor the first sensing region to generate at least one first sensing amount;
   at least one second sensor, configured to monitor the second sensing region to generate at least one second sensing amount;
   an initial coordinate generating module, configured to generate an initial coordinate according to the at least one first sensing amount and the at least one second sensing amount, and to determine whether a touch point corresponding to the initial coordinate is in the intersection region;

a correction value generating module, configured to generate a correction value according to the at least one first sensing amount and the at least one second sensing amount when a determination result of the initial coordinate generating module is affirmative; and a corrected coordinate generating module, configured to multiply the initial coordinate by a first weight to generate a first weighted result, to multiply the correction value by a second weight to generate a second weighted result, and to add the first weighted result and the second weighted result to generate a corrected coordinate of the touch point.

2. The touch control system according to claim 1, wherein when the determination result of the initial coordinate generating module is negative, the initial coordinate is determined as a position of the touch point.

3. The touch control system according to claim 1, wherein the intersection region is a range in which the initial coordinate has an error that is higher than a predetermined threshold.

4. The touch control system according to claim 1, wherein the correction value generating module generates the correction value according to an equation:

$$Y = \frac{(Ucd - Dcd)}{(Ucd + Dcd)} \times y\_scale + y\_shift,$$

where Ucd represents a total of the at least one first sensing amount, Dcd represents a total of the at least one second sensing amount, y_shift represents a reference coordinate in a first reference direction, and y_scale represents a predetermined width in the reference direction.

5. The touch control system according to claim 4, wherein a width of the intersection region in the reference direction is substantially three times of the predetermined width.

6. The touch control system according to claim 1, wherein values of the first weight and the second weight are associated with the initial coordinate; as the initial coordinate gets closer to a center of the intersection region in a reference direction, the first weight gets smaller and the second weight gets larger.

7. The touch control system according to claim 1, wherein the initial coordinate generating module generates the initial coordinate $Y_0$ according to an equation:

$$Y_0 = \frac{Ucd}{(Ucd + Dcd)} \times y_1 + \frac{Dcd}{(Ucd + Dcd)} \times y_2,$$

where Ucd represents a total of the at least one first sensing amount, Dcd represents a total of the at least one second sensing amount, $y_1$ represents a first coordinate generated according to the at least one first sensing amount, and $y_2$ represents a second coordinate generated according to the at least one second sensing amount.

8. A coordinate correction method for a touch panel, the touch panel comprising a first sensing region and a second sensing region, the first sensing region being monitored by at least one first sensor to generate at least one first sensing amount, the second sensing region being monitored by at least one second sensor to generate at least one second sensing amount, a part of the first sensing region and a part of the second sensing region being defined as an intersection region, the coordinate correction method comprising:

a) generating an initial coordinate according to the at least one first sensing amount and the at least one second sensing amount;

b) determining whether a touch point corresponding to the initial coordinate is in the intersection region;

c) when a determination result of step (b) is affirmative, generating a correction value according to the at least one first sensing amount and the at least one second sensing amount;

d) multiplying the initial coordinate by a first weight to generate a first weighted value, and multiplying the correction value by a second weight to generate a second weighted result; and e) adding the first weighted result and the second weighted result to generate a corrected coordinate of the touch point.

9. The coordinate correction method according to claim 8, further comprising:

when the determination result of step (b) is negative, determining the initial coordinate as a position of the touch point.

10. The coordinate correction method according to claim 8, wherein the intersection region is a range in which the initial coordinate has an error that is higher than a predetermined threshold.

11. The coordinate correction method according to claim 8, wherein step (c) comprises generating the correction value according to an equation:

$$Y = \frac{(Ucd - Dcd)}{(Ucd + Dcd)} \times y\_scale + y\_shift,$$

where Ucd represents a total of the at least one first sensing amount, Dcd represents a total of the at least one second sensing amount, y_shift represents a reference coordinate in a first reference direction, and y_scale represents a predetermined width in the reference direction.

12. The coordinate correction method according to claim 11, wherein a width of the intersection region in the reference direction is substantially three times of the predetermined width.

13. The coordinate correction method according to claim 8, wherein values of the first weight and the second weight are associated with the initial coordinate; as the initial coordinate gets closer to a center of the intersection region in a reference direction, the first weight gets smaller and the second weight gets larger.

14. The coordinate correction method according to claim 8, wherein step (a) comprises generating the initial coordinate $Y_0$ according to an equation:

$$Y_0 = \frac{Ucd}{(Ucd + Dcd)} \times y_1 + \frac{Dcd}{(Ucd + Dcd)} \times y_2,$$

where Ucd represents a total of the at least one first sensing amount, Dcd represents a total of the at least one second sensing amount, $y_1$ represents a first coordinate generated according to the at least one first sensing amount, and $y_2$ represents a second coordinate generated according to the at least one second sensing amount.

\* \* \* \* \*